United States Patent
Morikawa et al.

[11] Patent Number: 5,860,214
[45] Date of Patent: Jan. 19, 1999

[54] SHEARING MACHINE WITH SICKLE-SHAPED BLADE

[75] Inventors: Sumio Morikawa, Sakai; Toshiji Ohga, Moriguchi; Nobuyuki Zakohji, Neyagawa; Masahiro Kondoh, Suminoe-ku, all of Japan

[73] Assignee: Ohyodo Diesel Co., Ltd., Japan

[21] Appl. No.: 659,439

[22] Filed: Jun. 6, 1996

[30] Foreign Application Priority Data

Aug. 24, 1995 [JP] Japan ................................. 7-216255

[51] Int. Cl.⁶ ........................................................ B25F 3/00
[52] U.S. Cl. ........................... 30/134; 72/330; 72/326; 72/144; 144/34.5
[58] Field of Search ............................. 30/134; 83/928; 144/34.5; 72/330, 326

[56] References Cited

U.S. PATENT DOCUMENTS

| | | | |
|---|---|---|---|
| 4,686,767 | 8/1987 | Ramun et al. | 30/134 |
| 4,776,093 | 10/1988 | Gross | 30/134 |
| 4,897,921 | 2/1990 | Ramun | 30/134 |
| 5,146,683 | 9/1992 | Morikawa et al. | 30/134 |
| 5,187,868 | 2/1993 | Hall | 30/134 |
| 5,301,882 | 4/1994 | Morikawa et al. | 30/134 X |
| 5,339,525 | 8/1994 | Morikawa | 30/134 |
| 5,359,775 | 11/1994 | Morikawa et al. | 30/134 |
| 5,375,329 | 12/1994 | Morikawa et al. | 30/134 |
| 5,471,747 | 12/1995 | Morikawa et al. | 30/134 |
| 5,619,881 | 4/1997 | Morikawa et al. | 30/134 X |

FOREIGN PATENT DOCUMENTS

4205781  9/1993  Germany.

Primary Examiner—M. Rachuba
Attorney, Agent, or Firm—Morrison Law Firm

[57] ABSTRACT

A shearing machine includes a sickle shaped upper jaw interacting scissors fashion with a generally linear lower jaw. The distal ends of the sickle shape begin shearing from opposite ends of a plate-type object at about the same time, with shearing progressing toward a central point. A transverse member and a return leg form, with the lower jaw, a J-shaped device. The upper jaw slides within the return of the J during the entire cutting operation, thereby overcoming any tendency for jaw spreading between the linear and sickle shaped cutters. A front cutting insert in the transverse member and a return cutting insert in the return leg, interact with a tip of the upper jaw to pierce, and then cut, a plate which is longer than the throat of the shearing machine, thereby enabling shearing of large plates. The initial piercing takes place simultaneously at the tip of the upper jaw and at an upward-directed point on the front cutting insert. This two-point contact stabilizes the plate during the initial stages of cutting. A pick-up tooth along the front of the lower jaw enhances the ability to engage a cylindrical object, and move it into position between the linear and sickle shaped cutters. The sickle shaped urges the cylindrical object into a central position, thereby reducing the force required for cutting. Blades are segmented and symmetrical about at least one axis to permit bringing a plurality of edges into effective cutting positions.

13 Claims, 9 Drawing Sheets

SHEARING MACHINE WITH SICKLE-SHAPED BLADE

BACKGROUND OF THE INVENTION

Removable shearing machines have been used as attachments on the end of the arm or boom of power shovels to shear steel sheets, steel reinforcing bars and the like. Various types of upper jaw shapes, lower jaw shapes and blade shapes have been developed according to the nature of the work. In the most generally used shearing machines, an upper blade and lower blade are disposed on an upper jaw and lower jaw, respectively. The blades are opened and closed crossing each other in a scissor fashion. In another type of shearing machine, a bend at the central portion of either one or both of the upper and lower blades prevents the steel to be sheared from slipping out past the blade tips once it is caught between the upper and lower blades.

Prior art shearing machines have the disadvantages described below.

In shearing machines having linear upper and lower blades that can open and close and that are pivoted around an axis:

(1) The space between the upper and lower blades is wide toward the outer tips of the blades, while a small triangle is formed at the base. The workpiece is mainly sheared toward the outer tips, away from the pivot. Thus, the output of the cylinder driving the upper and lower jaws operates inefficiently on the workpiece.

(2) In a pick-up operation, a workpiece is scissored between the tips of the upper blade and lower blade. Because of the left-right offset between the tips of the upper and lower blades, the workpiece rotates during the scissoring, thus preventing stable pick-up.

(3) Because the upper and lower blades are linear, the workpiece can slip toward the tip during shearing.

In shearing machines having bent blades, the problem described in (3) is overcome. However, regarding the problem described in (1), the output from the cylinder is used more efficiently than shearing with the tips of the blades, since the shearing of the workpiece takes place mainly toward the center of the upper and lower blades, rather than toward the tips. However, efficient shearing at the base portion of the blades can not take place. Also, the problem described in (2) above remains unresolved.

Another problem with prior-art shearing devices is:

(4) Bent blades result in high force concentration locally at the bend during shearing. This leads to greater wear at the bend compared to other portions of the blades, thus shortening the lifespan of the blades.

OBJECTS AND SUMMARY OF THE INVENTION

It is an object of the present invention is to provide a shearing device which overcomes the drawbacks of the prior art.

It is a further object of the invention to effectively overcome problems (1)–(4) described above.

It is a still further object of the present invention to:

(1) shear a workpiece at a position close to the pivot of the upper and lower jaws;

(2) prevent the workpiece from slipping toward the tips of the blades;

(3) allow stable pick-up operations without having the workpiece rotate at the tip of the upper and lower jaws; and (4) prevent excessive localized force from being applied to the blades.

In order to overcome these drawbacks, the present invention comprises: an upper jaw and a lower jaw disposed rotatably around a pivot so that the blades can open and close relative to each other, a cylinder opening and closing the upper jaw and the lower jaw, a linear lower blade disposed length-wise on the lower jaw, an upper blade disposed length-wise on the upper jaw, shaped arcuate and concave relative to the lower jaw, and shaped arcuate so that the space between the upper blade and the lower blade is closed off from the tip to the base as the upper blade and the lower blade close toward each other.

With this configuration, the workpiece interposed between the upper and lower blade moves toward the base of the blades as the upper and lower jaws close. Because the base of the blades is close to the pivot of the upper and lower jaws, the cylinder driving the jaws is able to act upon the workpiece efficiently. Also, force is not localized to specific points on the blades since the upper blade is shaped arcuate, rather than with an angular bend as in the prior art. Thus, rapid, localized wear on the blades is prevented.

In the shearing machine of the present invention, the workpiece is drawn toward the base of the blades, and also, the output from the cylinder acts upon the workpiece at, effectively, maximum efficiency. In other words, a line drawn perpendicularly from the pivot to the axis of the cylinder is at its minimum length when the upper jaw and the lower jaw are at opened all the way. Also, as the upper jaw and the lower jaw approach the point where they close all the way, this line is at its maximum length. The longer the perpendicular line from the pivot to the axis of the cylinder, the more shearing force operates on the workpiece according to the principles of leverage. With the arcuate shape of the upper blade, the output from a small cylinder can provide efficient shearing.

In order to perform pick-up operations effectively, the shearing machine of the present invention comprises a beak formed at the tip of the upper jaw along the thickness-axis of the upper jaw, and a lip formed at the tip of the lower jaw along the thickness-axis of the lower jaw. The lip is positioned directly adjacent to the outer limit of the path of the beak. The top side of the workpiece is supported by the lip, and the workpiece is stably supported between the beak and the lip.

Briefly stated, the present invention provides a shearing machine that includes a sickle shaped upper jaw interacting scissors fashion with a generally linear lower jaw. The distal ends of the sickle shape begin shearing from opposite ends of a plate-type object at about the same time, with shearing progressing toward a central point. A transverse member and a return leg form, with the lower jaw, a J-shaped device. The upper jaw slides within the return of the J during the entire cutting operation, thereby overcoming any tendency for jaw spreading between the linear and sickle shaped cutters. A front cutting insert in the transverse member and a return cutting insert in the return leg, interact with a tip of the upper jaw to pierce, and then cut, a plate which is longer than the throat of the shearing machine, thereby enabling shearing of large plates. The initial piercing takes place simultaneously at the tip of the upper jaw and at an upward-directed point on the front cutting insert. This two-point contact stabilizes the plate during the initial stages of cutting. A pick-up tooth along the front of the lower jaw enhances the ability to engage a cylindrical object, and move it into position between the linear and sickle shaped cutters. The sickle shaped urges the cylindrical object into a central position, thereby reducing the force required for cutting. Blades are segmented and symmetrical about at least one axis to permit bringing a plurality of edges into effective cutting positions.

According to an embodiment of the invention, there is provided a sickle-shaped shearing machine comprising: a lower jaw, a generally linear lower blade on the lower jaw, an upper jaw pivotably connected to the lower jaw, a sickle shaped inner surface on the upper jaw, a sickle shaped upper blade on the upper jaw positioned for scissors-type interacting with the lower blade, the sickle shape being generally concave upward, the sickle shape being a substantially constant curve over at least a substantial portion of the upper blade, means for opening and closing the upper jaw and the lower jaw, and the means for opening and closing including means for closing a space between the upper blade and the lower blade starting from distal ends of the upper and lower blades toward an intermediate location on the blades.

According to a feature of the invention, there is provided a shearing machine comprising: an upper jaw, the lower jaw having a J shape with a main shearing blade, a transverse shearing blade and a return shearing blade, an axis effective for permitting the upper jaw and the lower jaw to rotate with respect to each other, a tip on the upper jaw, the tip fitting into the J shape, and the tip being effective for scissors-type interaction with the main shearing blade, the transverse shearing blade and the return shearing blade, whereby the tip and the J shape pierce a plate overlying the J shape.

According to a further feature of the invention, there is provided a shearing machine comprising: an upper jaw, a lower jaw, means for permitting relative rotation of the upper jaw and the lower jaw, a U-shaped nose piece on the lower jaw forming a J-shaped lower jaw having a lower main cutting insert, a transverse cutting insert and a return cutting insert at inward-facing edges thereof, the upper jaw including a tip extending fully across a forward end thereof for scissors-type interaction with a forward portion of the lower main cutting insert, the transverse cutting insert and the return cutting insert, the upper jaw further including an upper main cutting insert for scissor-type interaction with a remainder of the lower main cutting insert, and the upper jaw having an inner contour which positions the tip into scissors-type relationship with the lower jaw before a remainder of the upper jaw reaches a position to interact with the lower jaw.

According to a still further feature of the invention, there is provided a shearing machine comprising: an upper jaw, a lower jaw, means for opening and closing the upper and lower jaws, an upper blade on the upper jaw, a lower blade on the lower jaw, the upper blade and lower blade being positioned for scissors-type interaction during closing of the upper jaw and the lower jaw, the upper blade being curved in a generally smooth arc, and a tip of the upper blade beginning scissors-type interaction with the lower blade no later than a rear portion of the upper blade begins scissors-type interaction with the lower blade.

According to another feature of the invention, there is provided a shearing machine comprising: an upper jaw, a lower jaw, means for opening and closing the upper and lower jaws, the lower jaw being substantially J shaped with a lower main cutting insert along a long axis of the J, a transverse cutting insert along a transverse axis of the J and a return cutting insert along a short axis of the J, and a pick-up tooth on the transverse axis, the pickup tooth having a point at an outer portion thereof, and the pickup tooth being positioned to assist in engagement of the lower jaw with an object to be cut.

The above, and other objects, features and advantages of the present invention will become apparent from the following description read in conjunction with the accompanying drawings, in which like reference numerals designate the same elements.

DETAILED DESCRIPTION OF THE PREFERRED EMBODIMENTS

Figure 1:
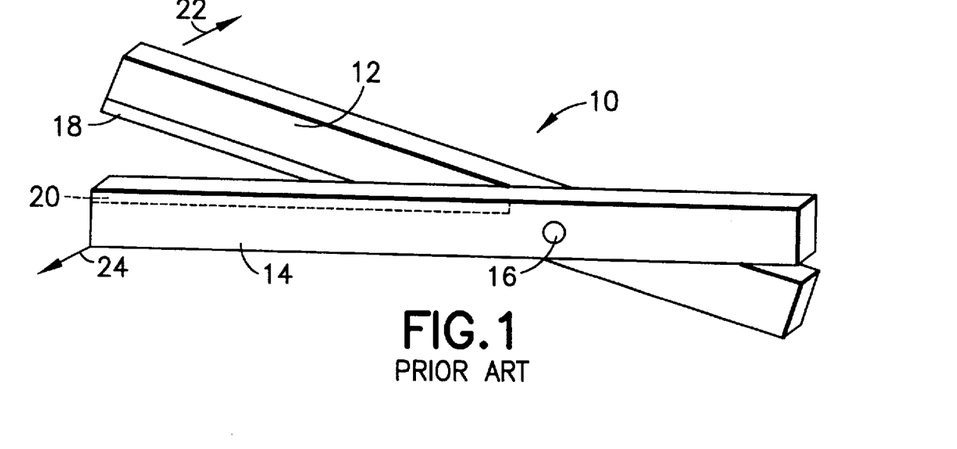
FIG. 1 is a simplified schematic diagram of a conventional shearing machine.

Referring first to FIG. 1, a scissors-type shearing machine according to the prior art, the jaws of which are shown generally at 10, includes an upper jaw 12 and a lower jaw 14, pivoted together at an axis 16. A linear upper cutting insert 18, shown in solid line, is affixed at a lower edge of upper jaw 12. A linear lower cutting insert 20, shown in dashed line, is affixed to an upper edge of lower jaw 14 adjacent upper cutting insert 18. A suitable force-generation means such as, for example, one or more conventional hydraulic cylinders (not shown), urges relative rotation of upper jaw 12 and lower jaw 14 about axis 16.

As is conventional in shearing machines designed for heavy-duty shearing of metal, each jaw is made of a steel having a ductility and strength suitable for fabrication, with a cutting insert at the scissors-like locations for performing the actual shearing. The cutting inserts are generally of a harder steel, or alloy, which may be specially heat treated, or chemically modified to resist damage during cutting. Due to the special nature of the material of which the cutting inserts are made, the same material is generally not suitable for use to form the remainder of the structure of a jaw. However, cutting inserts are conventionally made to be replaceable, thereby reducing maintenance costs. Also, cutting inserts often have unilateral or bilateral symmetry, thereby permitting their removal, rotation and reinstallation to take advantage of two or more of their edges between replacement intervals.

When shearing machine 10 is applied to cutting tough materials such as, for example, a steel plate, or a reinforcing rod, two problems occur. Because of the angle between upper cutting insert 18 and lower cutting insert 20, the plate or rod tends to move toward the tips of the jaws. In an extreme case, the plate or rod may slide completely out of the space between upper jaw 18 and lower jaw 20. Even when the material to be cut remains between upper and lower jaws 18 and 20, any outward motion of the material to be cut toward the tips of upper and lower jaws 18 and 20 is undesirable, since this moves outward the point at which cutting occurs. The resulting increase in the moment at the point where cutting occurs increases the force required from the force-generation means. This results in an increase in the size of the hydraulic cylinder which, in turn, results in increased size, weight and cost of the apparatus.

The other problem with scissors-type shearing machine 10 is that upper jaw 12 and lower jaw 14 tend to bend transversely outward as indicated by arrows 22 and 24. This is a familiar phenomenon, known as blade spreading, which almost everyone has encountered when attempting to cut with scissors a stack of paper which is too thick for the scissors to handle. This problem requires that the material of upper and lower jaws 12 and 14 be made thicker for the added strength required to resist blade spreading. When cutting tough material, such as steel sheet or rod, even very thick structures are only partly successful in resisting blade spreading. In addition, the required thick structures add to the cost of the apparatus.

Figure 2:
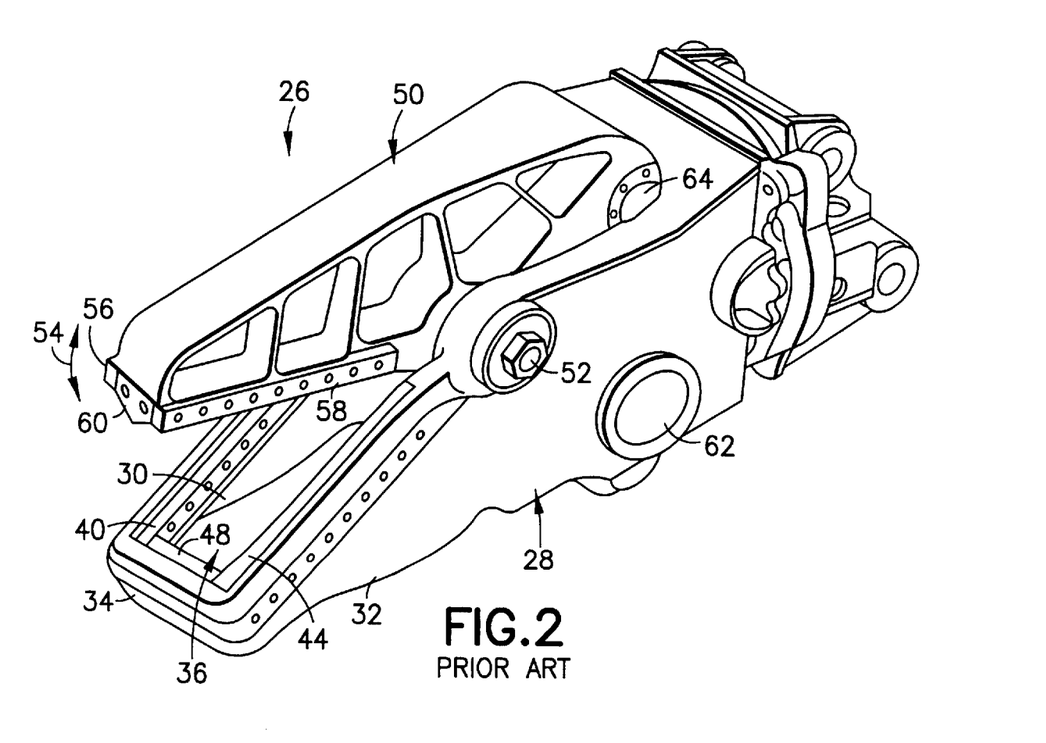
FIG. 2 is a perspective view of a slot-type shearing machine according to the prior art.

Referring now to FIG. 2, one prior-art solution to the spreading phenomenon includes a shearing machine 26 having a lower jaw 28 which includes a right cheek 30 and a left cheek 32. The forward ends of right cheek 30 and left cheek 32 are joined together with a forward transverse member 34 to form a generally rectangular slot 36. Right cheek 30 includes a recess 38 at its upper edge adjacent slot 36 containing a right cutting insert 40. Similarly, left cheek 32 contains a recess 42 at its upper edge adjacent slot 36 containing a left cutting insert 44. Transverse member 34 includes a recess 46 at its upper edge adjacent slot 36 containing a front cutting insert 48.

A one-piece upper jaw 50 is pivotably attached to lower jaw 28 at a pivot 52 to move through an arc indicated by a curved arrow 54. A right upper cutting insert 56 in the right lower edge of upper jaw 50, moves scissors fashion past right cutting insert 40 when upper jaw 50 moves as indicated. A left upper cutting insert 58 in the left lower edge of upper jaw 50 moves scissor fashion past left cutting insert 44 when upper jaw 50 moves as indicated. An upper front cutting insert 60, in the forward edge of upper jaw 50, moves in shearing relationship past front cutting insert 48 as upper jaw 50 reaches the end of its downward pivoting. An urging member such as, for example, a hydraulic cylinder (not shown) between left cheek 32 and right cheek 30, is pivoted to lower jaw 28 at a lower pivot axis 62 and to upper jaw 50 at an upper pivot axis 64.

Shearing machine 26 avoids jaw spreading of scissors-type machines by tying together the front ends of left and right cheeks 32 and 30. In effect, this creates a pair of parallel scissors-type cutters, to which is added a front transverse cutter. When cutting a plate which extends past the forward tip of upper jaw 50, the transverse cutter, made up of upper front cutting insert 60 and front cutting insert 48, severs a rectangular piece of the plate to enable advancement of shearing machine 26 in the resulting slot to begin the next cut. One of the problems with shearing machine 26 is that a shearing machine having two pairs of scissors requires twice the cutting force from the hydraulic cylinder, compared to a single scissors-type cutter, as illustrated in FIG. 1.

In addition, the problem of motion of the object to be cut forward toward, and perhaps past, the tip of upper jaw 50 remains unsolved by this prior art device.

Figure 3:
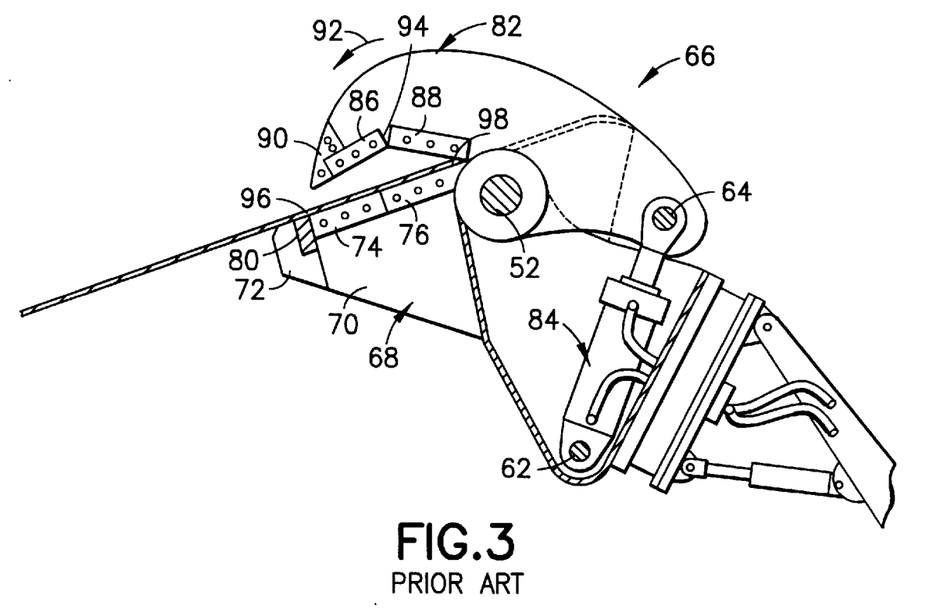
FIG. 3 is a side view of a slot-type shearing machine having an angled upper jaw, shown with the jaws open, according to the prior art.

Referring now to FIG. 3, a shearing machine 66, disclosed in German patent No. DE 4205781 A1, addresses part of the problem. A lower jaw 68 is a slot-type jaw similar to that shown in FIG. 2. In the cross section shown, a left cheek 70 is tied at its forward end to a right cheek (not shown) by a transverse member 72. First and second cutting inserts 74 and 76 are disposed in recesses at the upper and inner edge of left cheek 70. Similar cutting inserts (not shown) are positioned parallel to cutting inserts 74 and 76 at the upper and inner edge of a right cheek (not shown) which is omitted from the drawing for clarity of presentation. Cutting inserts 74 and 76, together with their counterparts on the not-illustrated right cheek define the sides of a rectangular slot (not shown). A lower front cutting insert 80, on the upper inner edge of transverse member 72, defines the front of the non-illustrated slot.

A right side of upper jaw 82 includes unillustrated cutting inserts, which are mirror-images of first and second cutting inserts 86 and 88, for scissors-like interaction with the unillustrated cutting inserts on the right cheek of lower jaw 68. An upper cutting insert 90, at the tip of upper jaw 82, interacts scissors fashion with lower front cutting insert 80, as well as forward portions of cutting insert 74, and the corresponding unillustrated cutting insert on the left cheek of lower jaw 68.

First and second cutting inserts 86 and 88 (and their unillustrated counterparts) are disposed at an angle to each other so that, an intermediate point 94 between them is displaced upward, in the drawing.

A hydraulic cylinder 84, between lower pivot axis 62 and upper pivot axis 64, urges upper jaw 82 in an arc 92 to pass into, and partly through, the rectangular slot defined by cutting inserts 74, 76, and 80. The upward displacement of intermediate point 94 is especially useful when cutting round bars (not shown). As the jaws close about it, a round bar tends to be displaced inward or outward toward intermediate point 94 where it is grasped and then severed.

As illustrated in the figure, a steel plate 96 may be placed over lower jaw 68. In this illustration, plate 96 extends from the deepest part between lower jaw 68 and upper jaw 82 to a forward position past the tips of these jaws. It will be noted that, in the partly closed condition shown, an inward end 98 of plate 96 may contact cutting insert 88. When upper jaw 82 begins closing, contact between cutting insert 88 (and its unillustrated counterpart) and inward end 98 tends to displace plate 96 forward until front cutting insert 90 contacts the upper surface of plate 96. This contact prevents further outward movement of plate 96.

Figure 4:
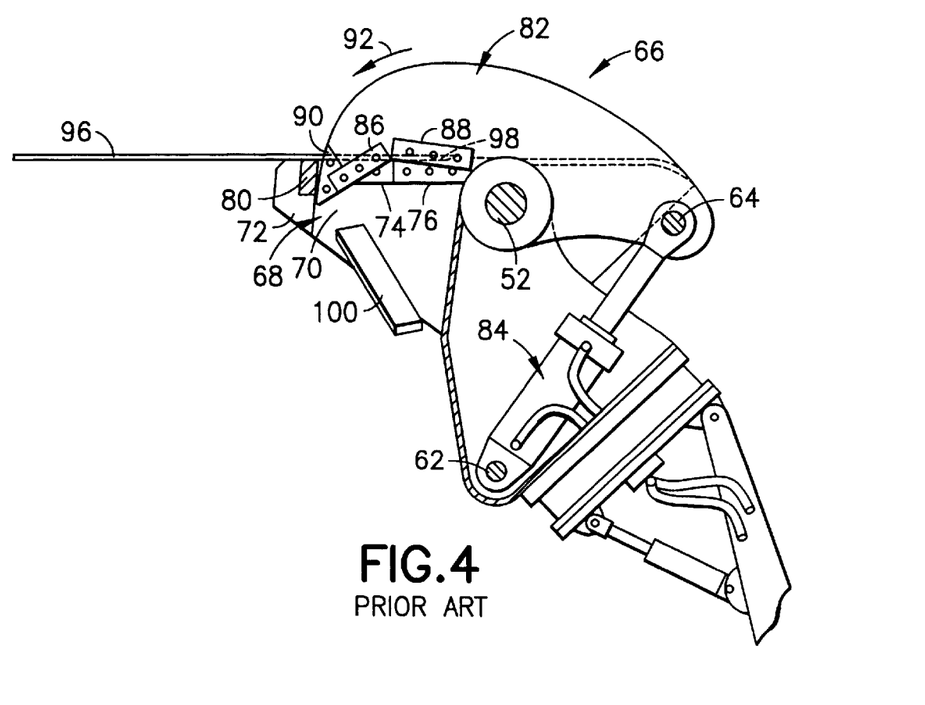
FIG. 4 is a side view of the prior-art slot-type shearing with the jaws fully closed.
Figure 4A:
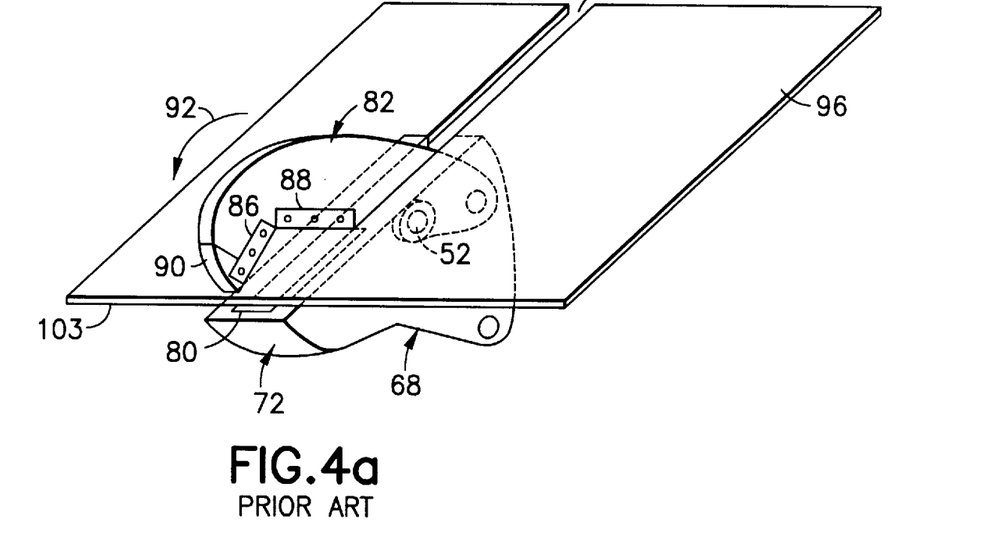
FIG. 4a is a perspective view of the prior-art shearing machine of FIGS. 3 and 4 during cutting of a large plate.

Referring now to FIG. 4a, extension of hydraulic cylinder 84 forces first the tip end of upper front cutting insert 90 through plate 96, and then severs right and left cuts through plate 96. During this latter operation, cutting inserts 86 and 88, with their unillustrated counterparts, cooperate with cutting inserts 74 and 76 (and with their unillustrated counterparts) to produce a pair of parallel cuts from the insertion point of upper front cutting insert 90 to the free inward end 98. Cutting proceeds both rearward and forward during this operation. Finally, a rectangular cutout 100 is freed from plate 96 to produce a slot (not shown) in plate 96. Upper jaw 82 is then raised to permit moving plate 96 rearward between the jaws, with the edges of the slot in plate 96 passing on opposite sides of upper jaw 82.

Referring now to FIG. 4b, the operation is repeated to deepen slot 101 as many times as necessary until a forward end 103 of plate 96 arrives inward of lower front cutting insert 80. A final cut then extends slot 101 to sever plate 96 into two separate pieces.

Several disadvantages exist in the device of the German patent. The fact that two parallel cuts are made at the same time, and that cutting takes place transversely and both forward and backward at least a portion of the time, increases the force required from hydraulic cylinder 84 by more than a factor of four compared to a single scissors-type cutter, of the type illustrated schematically in FIG. 1. Rectangular cutting inserts 86 and 88, and their unillustrated counterparts, that meet at intermediate point 94, tend to urge round bars etc. always to the same location, namely intermediate point 94. This tends to concentrate wear at intermediate point 94, and thus tends to shorten the life of the cutting inserts. The fact that inward end 98 of plate 96 may contact cutting insert 88 before upper front cutting insert 90 contacts the surface of plate 96 indicates that plate 96 may be slid forward a considerable distance before cutting begins. This reduces the length of each cutting step. Furthermore, it is inconvenient to handle the separated cutouts 100 produced during a cutting operation, as well as the two main portions of plate 96 that are separated by the slot produced therein. Finally, if the purpose of the cutting is to reduce the size of plate 96 for use in an application, cutouts 100 represent wasted material.

Figure 5:
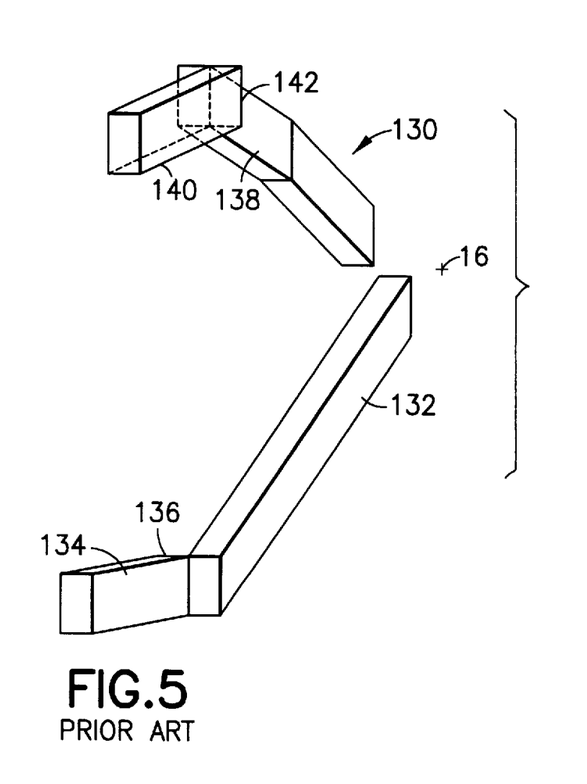
FIG. 5 is a perspective view of the blades of a prior-art shearing machine of the criss-cross type.

Referring now to FIG. 5, another approach to solving the same problems, disclosed in U.S. Pat. No. 5,471,747, employs criss-cross blades to avoid jaw spreading, and angled cutting inserts to move material to be cut toward the center of the jaws. A shearing machine 130, of which only the cutting inserts are shown, includes a lower jaw having mounted thereon a lower main cutting insert 132 nearest axis 16, and a lower tip cutting insert 134 at its tip. Lower main cutting insert 132 and lower tip cutting insert 134 are disposed parallel to each other, but are offset transversely from each other at a lower offset 136.

Similarly, an upper jaw includes an upper main cutting insert 138 nearest axis 16, and an upper tip cutting insert 140 at its tip. Upper main cutting insert 138 and upper tip cutting insert 140 are disposed parallel to each other, but are offset transversely from each other at an upper offset 142. Upper offset 142 and lower offset 136 are in opposite directions whereby, as seen looking from axis 16, upper tip cutting insert 140 passes scissors fashion to the left of lower tip cutting insert 134 while upper main cutting insert 138 passes scissors fashion to the right of lower main cutting insert 132. This criss-cross arrangement of the upper and lower cutting inserts resists jaw spreading since the transverse forces generated in upper and lower main cutting inserts 138 and 132 is countered by oppositely directed forces generated by upper and lower tip cutting inserts 140 and 134.

It will be noted that the cutting inserts on upper and lower jaws are angled away from their opposed members in order to urge material to be cut such as reinforcing bars, toward an intermediate point, in a manner similar to the operation of the prior-art apparatus in FIGS. 3 and 4a.

Figure 6:
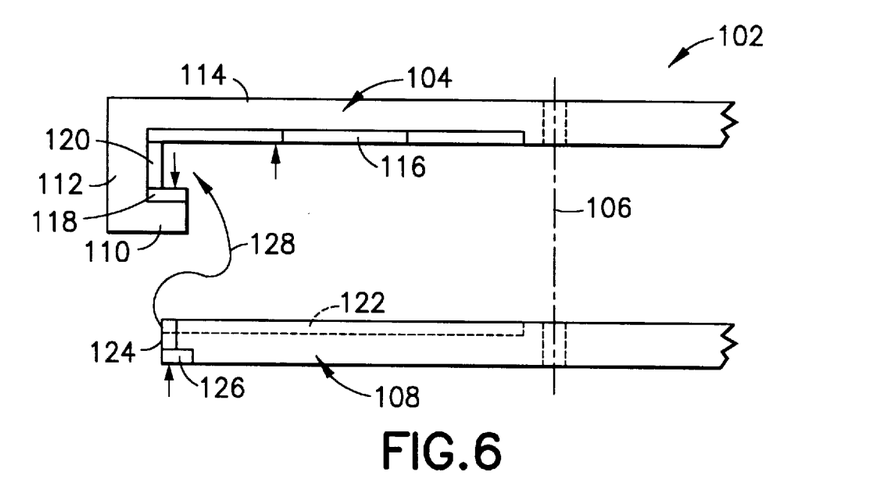
FIG. 6 is a simplified top view of shearing blades of a shearing machine according to an embodiment of the present invention.

Referring now to FIG. 6, a simplified schematic diagram of a shearing machine 102, according to the present invention, includes a J-shaped lower jaw 104 pivoted at an axis 106 to an upper jaw 108. A return leg 110 of lower jaw 104 is connected to a main leg 114 of lower jaw 104 by a transverse member 112. A lower main cutting insert 116 is disposed along an upper edge of main leg 114. A lower return cutting insert 118 is disposed along an upper edge of return leg 110 parallel to lower main cutting insert 116. A lower front cutting insert 120 is disposed at an upper edge of transverse member 112, spanning substantially the entire distance between lower main cutting insert 116 and lower return cutting insert 118.

An upper main cutting insert 122, shown in dashed line, is disposed along a lower edge of upper jaw 108 for scissors-type interaction with lower main cutting insert 116. An upper auxiliary cutting insert 126 is disposed on the tip end of upper jaw 108 for scissors-type interaction with lower return cutting insert 118. Finally, an upper tip cutting insert 124 is disposed on an outer edge of upper jaw 108 adjacent upper tip cutting insert 124.

In operation, the tip of upper jaw 108 is fitted slidably behind return leg 110 during substantially the entire cutting operation, as indicated by a curved arrow 128. Engagement of upper auxiliary cutting insert 126 with lower return cutting insert 118 during cutting prevents the jaw spreading experienced by the simple scissors-type shearing machine 10 of FIG. 1. The entire cutting sequence will be described below with reference to a more detailed drawing of the apparatus.

Figure 7:
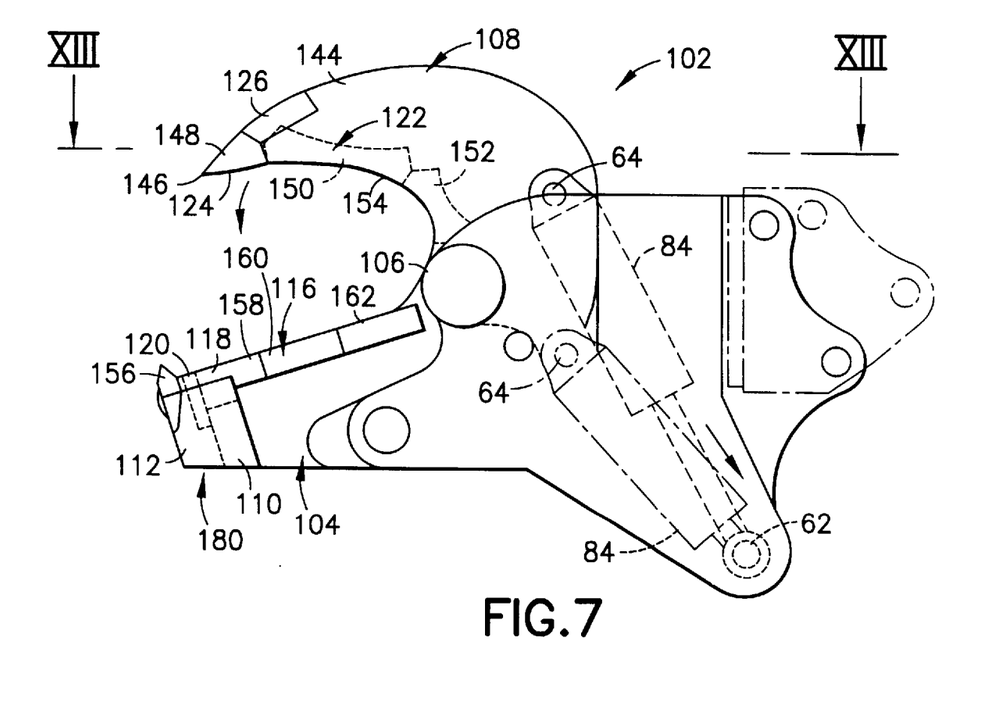
FIG. 7 is a side view of a shearing machine according to an embodiment of the present invention.
Figure 8:
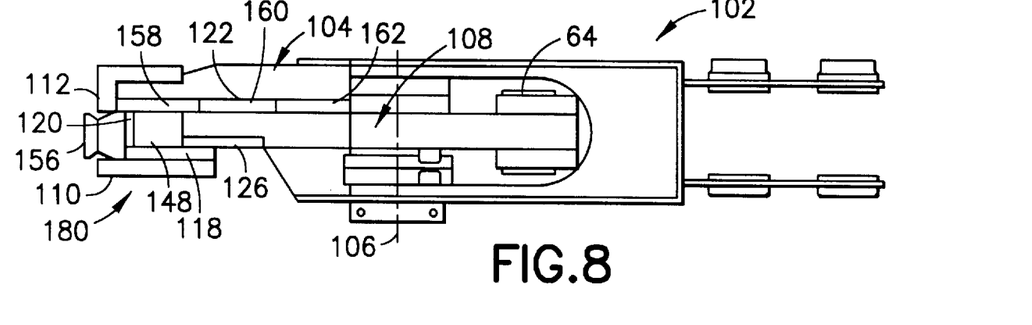
FIG. 8 is a partial cutaway top view of the shearing machine of FIG. 7.

Referring now to FIGS. 7 and 8, upper jaw 108 includes a curved outer contour 144, at least a portion of which is curved in a manner to be described that is related to a portion of a circle centered on axis 106. Upper tip cutting insert 124 includes a sharpened chisel-like tip 146 extending the entire width of upper jaw 108. Tip 146 passes close to lower front cutting insert 120 in generally scissors fashion. An outer contour 148 of upper tip cutting insert 124 forms an approximate continuation of the arc of outer contour 144 of upper jaw 108.

Upper main cutting insert 122 includes an upper forward main cutting insert 150 and an upper trailing main cutting insert 152. An inner contour 154 of the combination of the inner contour of upper tip cutting insert 124, upper forward main cutting insert 150 and upper trailing main cutting insert 152 forms a generally continuous sickle-shaped curve.

Upper forward main cutting insert 150 and upper trailing main cutting insert 152 are symmetrical about their center lines. Ends of upper forward main cutting insert 150 and upper trailing main cutting insert 152 are chamfered whereby a chamfered end of one abuts the chamfered end of the other so that inner contour 154 remains unbroken. Opposite sides of upper forward main cutting insert 150 and upper trailing main cutting insert 152 are identically curved so that, by rotating about the longitudinal centerline and about a transverse centerline, any one of the four cutting edges of each can be brought into cutting position to form a portion of inner contour 154.

As suggested by their depiction in dashed line, upper forward main cutting insert 150 and upper trailing main cutting insert 152 are disposed in the opposite (hidden) surface of upper jaw 108. To accommodate these elements, identically shaped pockets are formed in the opposite surface of upper jaw 108. Attachment of the cutting inserts in pockets in upper jaw 108 can be by any convenient means but is preferably by screws or bolts (not shown) through holes in the inserts into threaded holes in upper jaw 108.

A pick-up tooth 156, to be described later, is disposed at the forward end of transverse member 112. Pick-up tooth 156 extends upward beyond the upper extremity of transverse member 112.

Lower main cutting insert 116 is made up of three collinear cutting inserts, a forward lower main cutting insert 158, a center lower main cutting insert 160 and a trailing lower main cutting insert 162. These three cutting inserts are preferably parallelepipeds, and most preferably identical parallelepipeds having rectangular cross sections so that all four corners of each cutting insert can be brought into operation, and the locations of the three cutting inserts can be swapped as desired to equalize wear.

Figure 9:
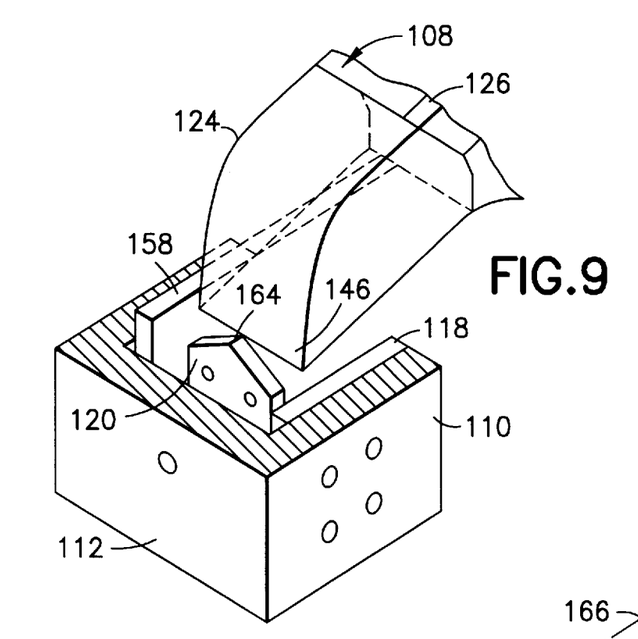
FIG. 9 is a close-up perspective view of the shearing machine of FIG. 7 showing the interaction of the blades at the start of cutting.

Referring now to FIG. 9, lower front cutting insert 120 includes an upwardly directed point 164. Point 164 is located at about the same horizontal level as the upper surface of forward lower main cutting insert 158. The upper surface of lower return cutting insert 118 is disposed a substantial distance below the upper surface of forward lower main cutting insert 158 and point 164.

Figure 13:
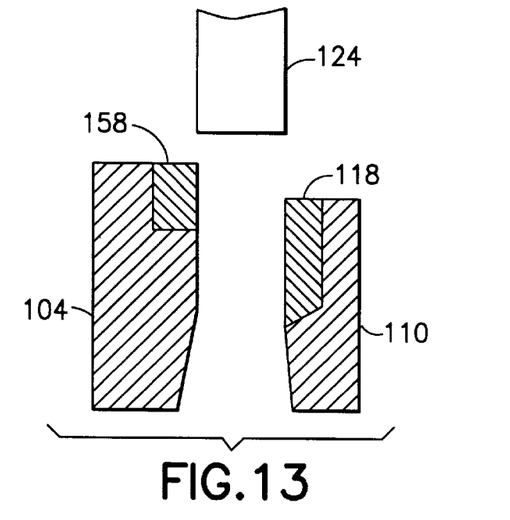
FIG. 13 is a cross section taken along XIII—XIII in FIG. 11.

Referring momentarily to FIG. 13, the height relationships between lower return cutting insert 118 and forward lower main cutting insert 158 are most clearly shown. It is to be noted that positioning point 164 and the upper surface of forward lower main cutting insert 158 at the same height tends to support plate 166 against rotation about forward lower main cutting insert 158, as would otherwise be the case if point 164 were not present at this height.

Figure 10:
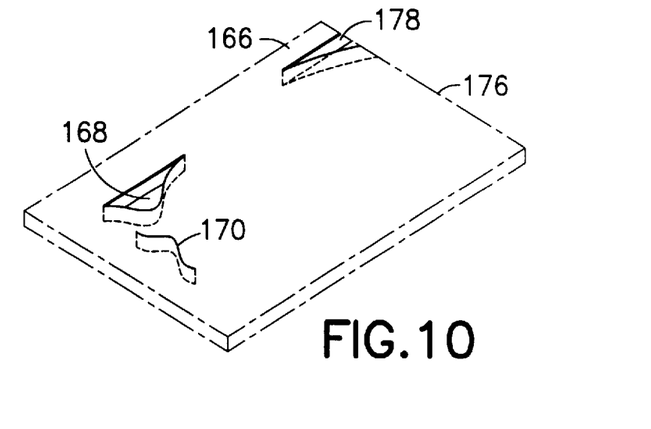
FIG. 10 is a perspective view of a plate showing the first penetrations of the shearing machine just after the blade positions of FIG. 9.

Referring now also to FIG. 10, as upper jaw 108 is urged downward, it first begins cutting at three locations on a plate 166 at about the same time. One of the locations is between upper tip cutting insert 124 adjacent tip 146 and lower main cutting insert 116 to produce a downward penetration 168. This downward penetration 168 begins over a relatively small portion of plate 166 due to the relative angular relationships between upper tip cutting insert 124 and forward lower main cutting insert 158. The second location is between point 164 and the forward end of tip 146 to produce an upward penetration 170. The third location is a forward cut 178 directed forward from an inner end of plate 166. The initial size of upward penetration 170 is also very small due to the presence of point 164. Downward penetration 168 and upward penetration 170 remain separated from each other at this stage of the cutting operation. The upper surface of lower return cutting insert 118 lies substantially below the upper surface of forward lower main cutting insert 158 and point 164, and thus remains out of contact with plate 166 at this time.

Figure 11:
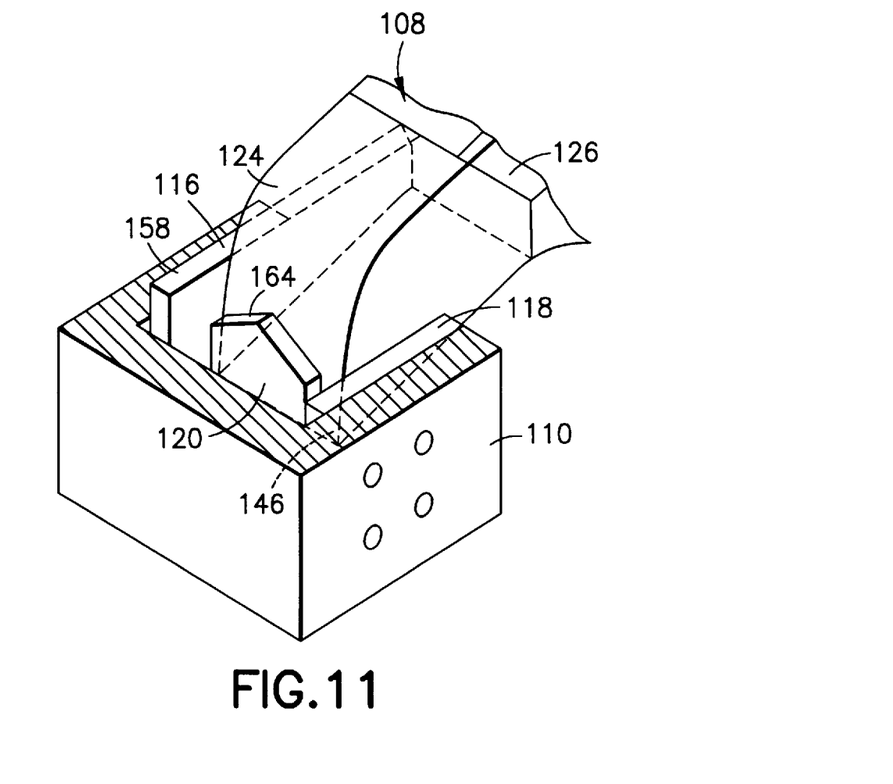
FIG. 11 is a close-up perspective view of the shearing machine of FIG. 7 at a stage of cutting later than that shown in FIG. 9.
Figure 12:
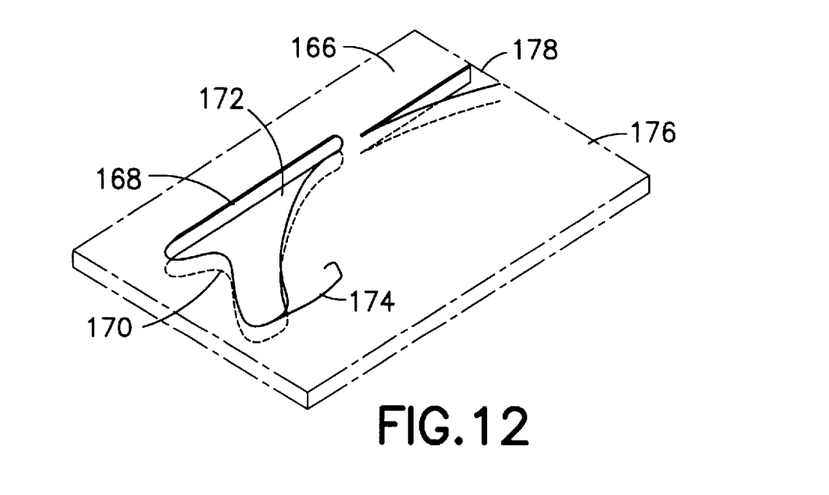
FIG. 12 is a perspective view of a plate showing the cuts produced by the shearing machine in the condition shown in FIG. 11.

Referring now to FIGS. 11 and 12, with further progress of cutting, upper tip cutting insert 124 has moved downward beyond point 164, thereby joining downward penetration 168 and upward penetration 170, and has begun producing a linear cut 172. At the position shown, linear cut 172 has progressed beyond the scissors action between the rear end of upper tip cutting insert 124 and forward lower main cutting insert 158, and cutting is taking place between upper forward main cutting insert 150 (not shown in FIG. 11) and an adjacent portion of upper main cutting insert 122. Forward cut 178 has continued toward linear cut 172. Scissors-type interaction has also moved along the length of lower return cutting insert 118, to produce a relief cut 174. At the position shown, lower return cutting insert 118 is no longer involved in cutting. As upper jaw 108 moves downward, upper auxiliary cutting insert 126 comes into contact with the inner surface of lower return cutting insert 118. Since the point at which cutting takes place has already progressed beyond the end of lower return cutting insert 118, no cutting takes place at upper auxiliary cutting insert 126. Instead, upper auxiliary cutting insert 126 serves as a bearing and wear-resisting member to counteract jaw spreading during the late process of cutting. Cutting proceeds only on linear cut 172 and forward cut 178, with the material of plate 166, in the generally U-shaped portion formed by linear cut 172, upward penetration 170 and relief cut 174 being bent downward as shown to permit the progress of linear cut 172 to an end 176 of plate 166. Then, the downward motion of upper jaw 108 is continued to bend the flap of plate 166 so produced to permit moving plate 166 forward to begin the next cut.

From the foregoing, it will be evident to one skilled in the art that the force required to produce a cut is minimized. Initially, high stress concentrations are produced at two generally point locations, one adjacent forward lower main cutting insert 158, and the other adjacent point 164. After the penetrations at these two locations are enlarged to join together, and cutting no longer is taking place on lower front cutting insert 120, penetration begins at a point generally adjacent lower return cutting insert 118, while cutting proceeds on linear cut 172. Then, cutting along lower return cutting insert 118 ends while progress on linear cut 172 and forward cut 178 continues to its completion.

If plate 166 has a longitudinal dimension less than the depth of lower jaw 104 and upper jaw 108, the initial contact of upper jaw 108 is inward of tip 146. In this case, linear cut 172 begins at the outer edge of plate 166, while forward cut 178 begins at end 176. Both cuts continue until the approaching ends of these two cuts meet, thereby separating plate 166.

Referring again to FIG. 8, transverse member 112 and return leg 110 are part of a nose piece 180 affixed to lower jaw 104.

Figure 14:
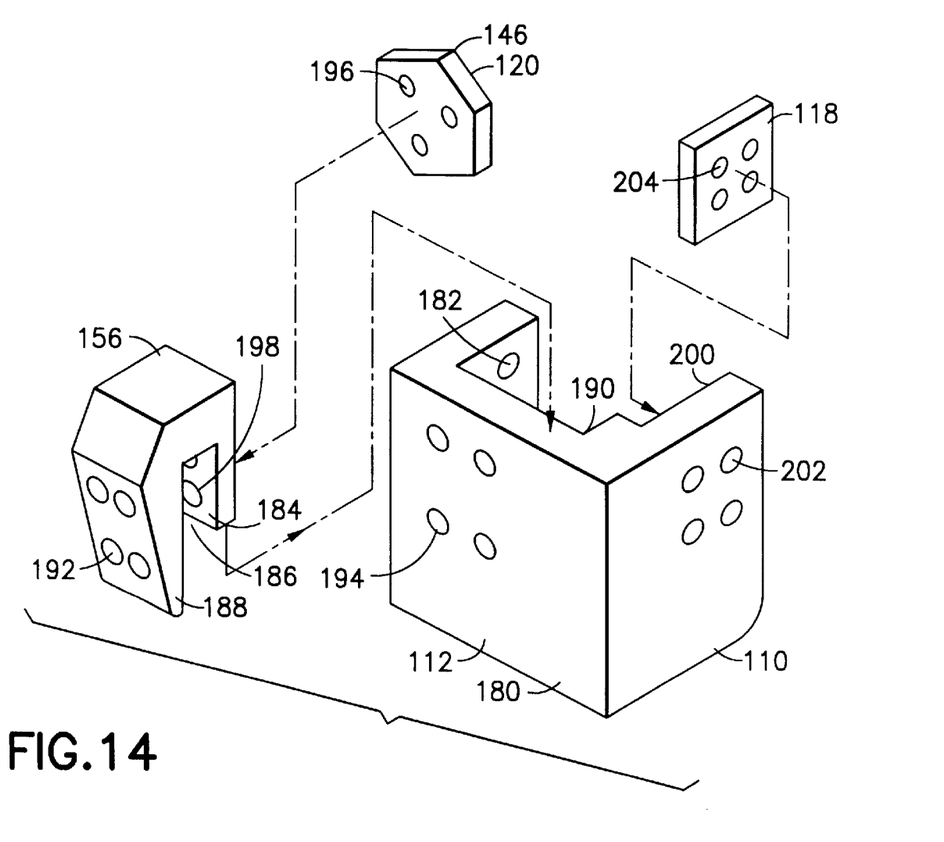
FIG. 14 is a close-up exploded view of the nose piece of the shearing machine of FIGS. 7 and 8.

Referring now to FIG. 14, nose piece 180 is affixed to the remainder of lower jaw 104 (not shown in FIG. 14) by any convenient means such as by bolts (not shown) passing through a plurality of holes 182 (one of which is shown) into the side surface of lower jaw 104. Pick-up tooth 156 includes a rear plate 184 defining a rear wall of a slot 186. A front plate 188 defines the front wall of slot 186.

A front pocket 190 in an inner surface of transverse member 112 reduces the thickness of transverse member 112 to a value permitting slot 186 to fit thereover, with rear plate 184 against the inner surface of front pocket 190 and the inner surface of front plate 188 against the outer surface of transverse member 112.

Pick-up tooth 156 is affixed to transverse member 112 using bolts (not shown) passing through a plurality of bolt holes 192 into a matching plurality of bolt holes 194 in transverse member 112.

Lower front cutting insert 120 is affixed to the extreme inner surface of rear plate 184 using a plurality of bolt holes 196 in lower front cutting insert 120 aligned with a matching plurality of bolt holes 198 in rear plate 184. It would be evident to one skilled in the art that lower front cutting insert 120 may be pocketed in a suitably shaped pocket (not shown) in the rearward facing surface of rear plate 184.

It will be noted that the illustrated embodiment of lower front cutting insert 120 is hexagonal shape, thereby providing six points 164 which may be rotated into an operating position by removing the bolts securing lower front cutting insert 120 in place, rotating it to bring another point 164 facing upward, and then re-securing lower front cutting insert 120. The pattern of bolt holes 196 and 198 is established to permit this type of positioning. Since cutting takes place principally at the portion of lower front cutting insert 120 facing upper tip cutting insert 124, lower front cutting insert 120 may be reversed to take advantage of the remaining six points 164, thereby providing 12 effective points 164.

Other shapes may be employed for lower front cutting insert 120 such as, for example, triangular, pentagonal, etc. provided that the desired point is available to pierce plate 166. In the alternative, lower front cutting insert 120 may be rectangular, whereby a straight edge is presented during cutting, with upper jaw 108 modified with a downward-directed tip (not shown). In either instance, the result is consistent. That is, one of the transverse elements includes a straight cutting insert, while the other includes a cutting insert having a point for producing the initial piercing action.

Pick-up tooth 156 is an optional, although very useful, feature of the invention. Pick-up tooth 156 may be omitted without destroying the utility of the remainder of the present invention. In an embodiment which omits pick-up tooth 156, lower front cutting insert 120 is affixed to the inner surface of transverse member 112, optionally aided by a suitably shaped pocket (not shown) therein.

A side pocket 200 in return leg 110 receives lower return cutting insert 118. Lower return cutting insert 118 is secured using a plurality of bolts (not shown) through a plurality of bolt holes 202 in return leg 110 and a matching plurality of bolt holes 204 in lower return cutting insert 118.

Figure 15:
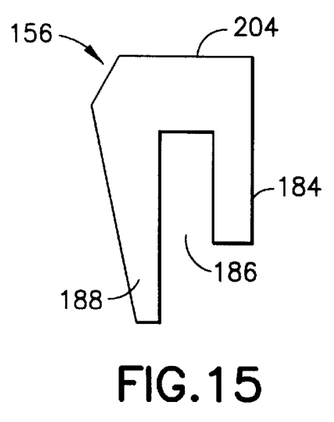
FIG. 15 is a side view of a pick-up tooth adapted for use in shearing a flat plate.

Referring now to FIG. 15, pick-up tooth 156 includes a generally flat top 204. Flat top 204 is convenient for handling flat objects such as, for example, plate 166.

Figure 16:
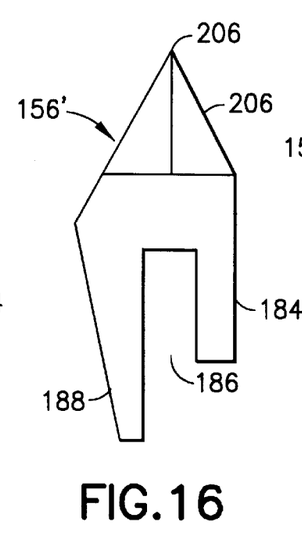
FIG. 16 is a side view of a pick-up tooth adapted for use in shearing a round bar.

Referring now to FIG. 16, for grasping non-flat objects, an embodiment of a pick-up tooth 156' includes a chisel-type pointed portion 206 extending upward therefrom. Pointed portion 206 is convenient for fitting under, for example, cylindrical reinforcing bars (not shown). Once fitted under such a cylindrical object, a reinforcing bar is urged toward the approximate center of the jaws.

Figure 17:
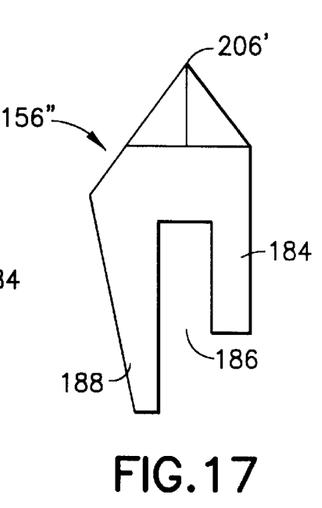
FIG. 17 is a side view of a further pick-up tooth.

Referring now to FIG. 17, a further embodiment of a pick-up tooth 156" includes a chisel-type pointed portion 106' which includes a more obtuse angle than is the case for pick-up tooth 156' of FIG. 16.

Figure 18:
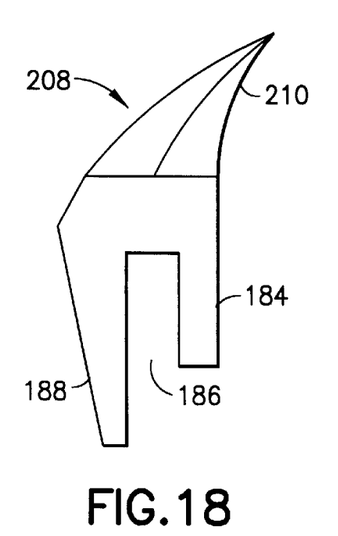
FIG. 18 is a side view of a still further pick-up tooth.

Referring now to FIG. 18, a further embodiment of a pick-up tooth 208 includes a chisel-type pointed portion 210 which is inclined as shown to enhance the ability of pick-up tooth 208 to fit under a material which it is desired to pick up and cut.

It is within the contemplation of the invention that vertical grooves (not shown) may be cut into pointed portions 206, 206' or 210 of FIGS. 16, 17 or 18, respectively, thereby producing the equivalent of claws or teeth.

Figure 19:
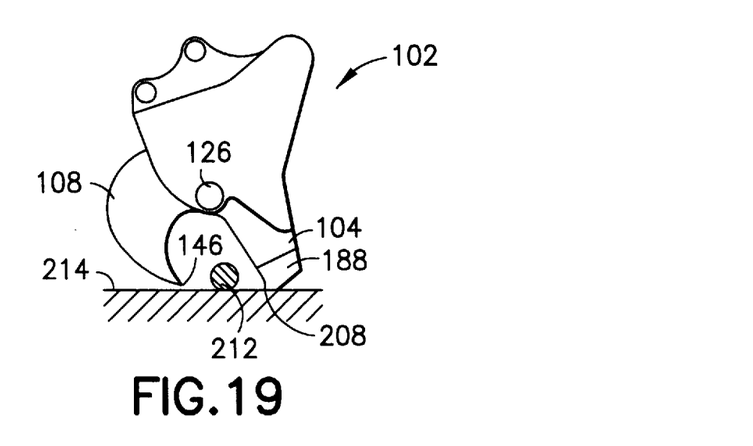
FIG. 19 is a simplified side view of the shearing machine of FIG. 7 at an initial stage of picking up and shearing a round bar.
Figure 20:
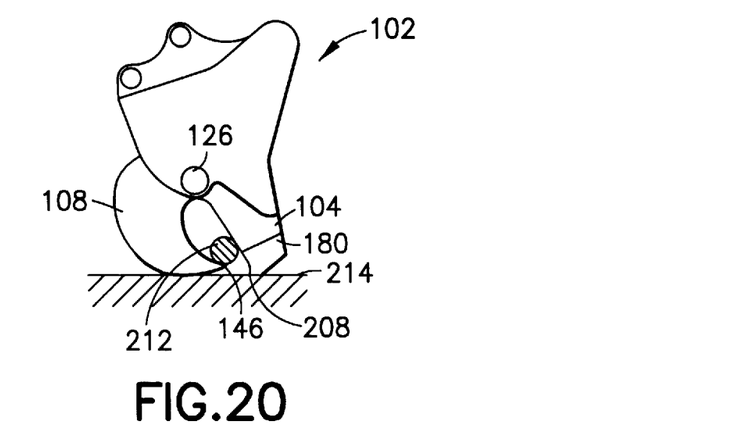
FIG. 20 is a further stage of picking up and shearing a round bar.
Figure 21:
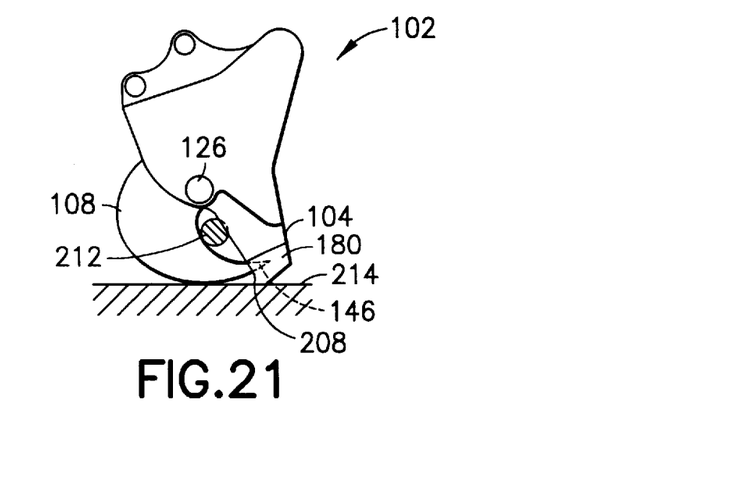
FIG. 21 is a final stage of shearing a round bar.

Referring now to FIGS. 19–21, the sequence for picking up and cutting a reinforcing rod 212 is shown.

Referring first specifically to FIG. 19, reinforcing rod 212 is assumed to be lying upon a surface 214 such as, for example, the ground. Shearing machine 102 is rotated using conventional controls of a power shovel (not shown) supporting it until tip 146 and pick-up tooth 208 (or 156' or 156") are located at about the level of surface 214 and on opposite sides of reinforcing rod 212.

Referring now to FIG. 20, upper jaw 108 begins to close. Pick-up tooth 208 passes under reinforcing rod 212 and moves reinforcing rod 212 into contact with the inner surface of tip 146. At this point, the sickle shape of the inner surface of upper jaw 108 permits reinforcing rod 212 to slide inward toward a center of upper jaw 108.

Referring now to FIG. 21, upper jaw 108 is closed sufficiently to displace reinforcing rod 212 to about the center of the sickle-shaped curved portion of upper jaw 108. At this position, reinforcing rod 212 is prevented from moving either forward or backward. Thus, reinforcing rod 212 is retained in this position while upper jaw 108 continues to close, thereby severing reinforcing rod 212.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A sickle-shaped shearing machine comprising:
   a lower jaw;
   a generally linear lower blade on said lower jaw;
   an upper jaw pivotably connected to said lower jaw;
   a sickle shaped inner surface on said upper jaw;
   a sickle shaped upper blade on said upper jaw;
   means for interacting said sickle shaped upper blade with said lower blade in a scissors-like cutting action;
   said sickle shaped inner surface and said sickle shaped upper blade each being shaped generally concave upward in a substantially constant curve over at least a substantial portion of each of said inner surface and said upper blade;
   means for opening and closing said upper jaw and said lower jaw; and
   said means for opening and closing including means for closing a space between said upper blade and said lower blade starting from a distal end of each of said upper and lower blades toward an intermediate location on each of said upper and lower blades.

2. A sickle shaped shearing machine as described in claim 1 further comprising:
   a tip at an end of said upper jaw, said tip extending along a substantially transverse direction of said upper jaw;
   a lip at an end of said lower jaw; and
   means for interacting said lip with said tip in a scissors-like cutting action.

3. A shearing machine comprising:
   an upper jaw and a lower jaw;
   said lower jaw having a J shape with a main shearing blade, a transverse shearing blade and a return shearing blade;
   an axis effective for permitting said upper jaw and said lower jaw to rotate with respect to each other;

a tip on said upper jaw;

said tip fitting into said J shape; and means for interacting said tip with said main shearing blade, said transverse shearing blade and said return shearing blade, whereby said tip and said J shape pierce a plate overlying said J shape.

4. Apparatus according to claim 3, further comprising said upper jaw having an outer contour sufficiently curved to remain within said J shape during substantially all of respective rotation of said upper and lower jaw.

5. Apparatus according to claim 3, further comprising:

one of said tip and said transverse shearing blade having a point directed in the direction of the other thereof;

said point being positioned to contact said plate at substantially the same time as said tip contacts said plate, whereby said plate is supported at two spaced-apart points during initial stages of cutting said plate; and said return blade being positioned further from said tip than said transverse shearing blade and said main shearing blade, whereby scissors-type cutting action by said return blade begins at a time substantially later than does cutting action by said transverse shearing blade and said main shearing blade, whereby a required shearing force is reduced.

6. A shearing machine comprising:

an upper jaw;

a lower jaw;

means for permitting relative rotation of said upper jaw and said lower jaw;

a U-shaped nose piece on said lower jaw forming a J-shaped lower jaw having a lower main cutting insert, a transverse cutting insert and a return cutting insert at inward-facing edges thereof;

said upper jaw including a tip extending fully across a forward end thereof for scissors-type interaction with a forward portion of said lower main cutting insert, said transverse cutting insert and said return cutting insert;

said upper jaw further including an upper main cutting insert for scissor-type interaction with a remainder of said lower main cutting insert; and said upper jaw having an inner contour which positions said tip into scissors-type relationship with said lower jaw before a remainder of said upper jaw reaches a position to interact with said lower jaw.

7. Apparatus according to claim 6, further comprising:

said lower main cutting insert being substantially linear; and said inner contour being a substantially continuous arc directed away from said lower jaw, whereby material being cut tends to move toward an intermediate position between said upper jaw and said lower jaw.

8. Apparatus according to claim 6, wherein said upper jaw includes a means for maintaining an outer contour between said main cutting insert and said return cutting insert during substantially an entire cutting action.

9. Apparatus according to claim 8, further comprising:

an upper auxiliary cutting insert on said upper jaw;

said upper auxiliary cutting insert being disposed rearward of said tip on a side of said upper jaw facing said return cutting insert; and said upper auxiliary cutting insert bearing against said return cutting insert after completion of scissors-type interaction between said tip and said return cutting insert, whereby said upper auxiliary cutting insert prevents wear on a remainder of said upper jaw from said return cutting insert.

10. A shearing machine comprising:

an upper jaw;

a lower jaw;

means for opening and closing said upper jaw and said lower jaw;

an upper blade on said upper jaw;

a lower blade on said lower jaw;

means for interacting said upper blade with said lower blade in a scissors-like cutting action during closing of said upper jaw and said lower jaw;

said upper blade being curved in a generally smooth arc;

a lip on a front end of said lower blade;

a tip on a front end of said upper blade and means for interacting said tip with said lip in a scissors-like cutting action no later than when a rear portion of said upper blade interacts with said lower blade in a scissors-like cutting action upon said closing of said upper jaw and said lower jaw.

11. A shearing machine comprising:

an upper jaw;

a lower jaw;

means for opening and closing said upper and lower jaws;

said lower jaw being substantially J shaped with a lower main cutting insert along a long axis of said J, a transverse cutting insert along a transverse axis of said J and a return cutting insert along a short axis of said J; and a pick-up tooth on said transverse axis;

said pickup tooth having a point at an outer portion thereof; and said pickup tooth being positioned to assist in engagement of said lower jaw with an object to be cut.

12. A shearing machine according to claim 11, wherein said point includes a chisel shaped point.

13. A sickle shaped shearing machine as described in claim 1, wherein said means for opening and closing said upper jaw and said lower jaw includes a hydraulic cylinder connecting said upper jaw and said lower jaw.

* * * * *